(12) United States Patent
Sato

(10) Patent No.: US 9,552,018 B2
(45) Date of Patent: Jan. 24, 2017

(54) ELECTRONIC APPARATUS

(71) Applicant: Kabushiki Kaisha Toshiba, Minato-ku, Tokyo (JP)

(72) Inventor: Yuki Sato, Ome Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 75 days.

(21) Appl. No.: 14/600,243

(22) Filed: Jan. 20, 2015

(65) Prior Publication Data

US 2016/0011628 A1 Jan. 14, 2016

Related U.S. Application Data

(60) Provisional application No. 62/023,522, filed on Jul. 11, 2014.

(51) Int. Cl.
*G06F 1/16* (2006.01)

(52) U.S. Cl.
CPC ........... *G06F 1/1656* (2013.01); *G06F 1/1626* (2013.01); *G06F 1/1652* (2013.01)

(58) Field of Classification Search
CPC ..... G06F 1/1626; G06F 1/1652; G06F 1/1656
See application file for complete search history.

(56) References Cited

U.S. PATENT DOCUMENTS

| 8,035,577 | B2 | 10/2011 | Lafarre et al. |
| 9,349,777 | B2 * | 5/2016 | An .................... H01L 27/3244 |
| 2013/0010405 | A1 * | 1/2013 | Rothkopf ............ H04M 1/0216 361/679.01 |

FOREIGN PATENT DOCUMENTS

| JP | 10-310099 A | 11/1998 |
| JP | 2007-216597 A | 8/2007 |
| JP | 2008-530611 A | 8/2008 |
| JP | 2008-228249 A | 9/2008 |
| JP | 2013-106914 A | 6/2013 |
| JP | 2013-175549 A | 9/2013 |

\* cited by examiner

*Primary Examiner* — Courtney Smith
*Assistant Examiner* — Keith Depew
(74) *Attorney, Agent, or Firm* — Knobbe, Martens, Olson & Bear LLP

(57) ABSTRACT

According to one embodiment, an electronic apparatus includes a main body deformable in a flat state and a bent state, and a spring structure which is provided on the main body and keeps the main body in the flat state or the bent state. The main body includes an elastic member, and first and second rigid members. The spring structure includes a plate spring which extends in a direction of crossing the elastic member, and is supported by the first and the second rigid members on both ends of the plate spring.

13 Claims, 10 Drawing Sheets

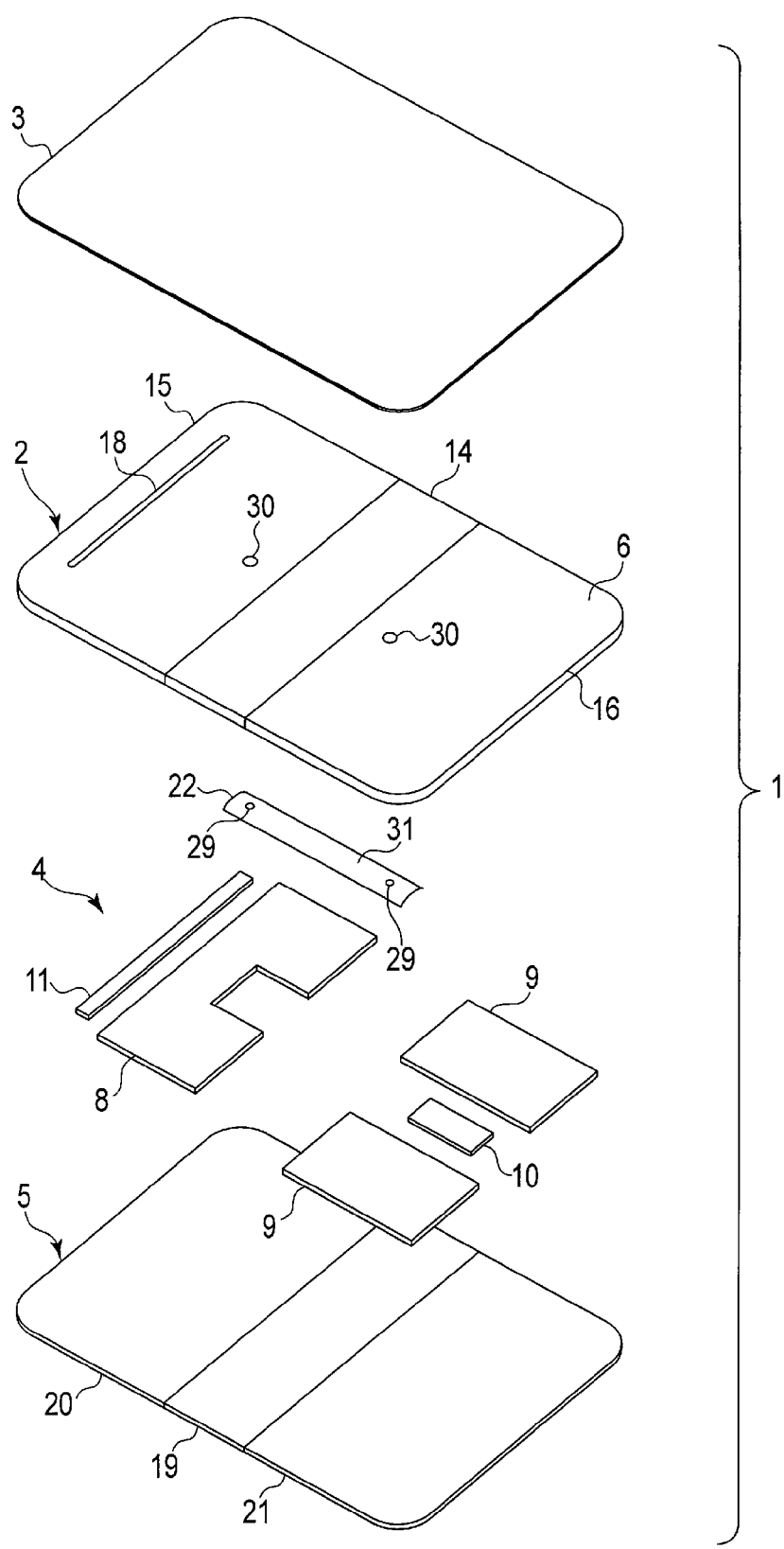
F I G. 3

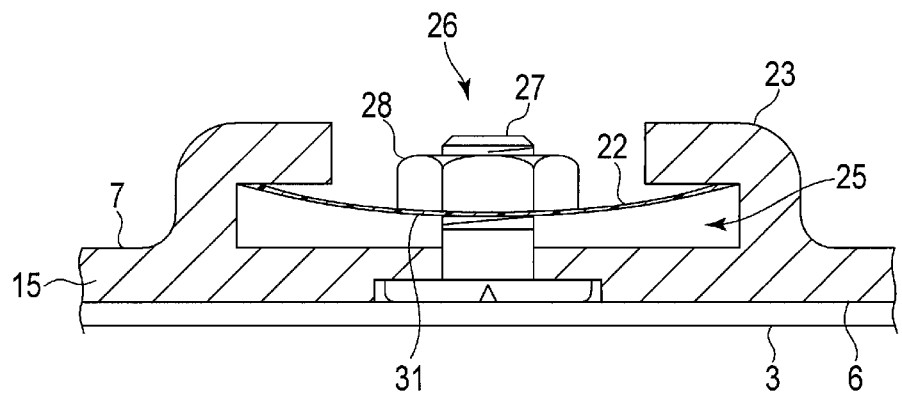
F I G. 17
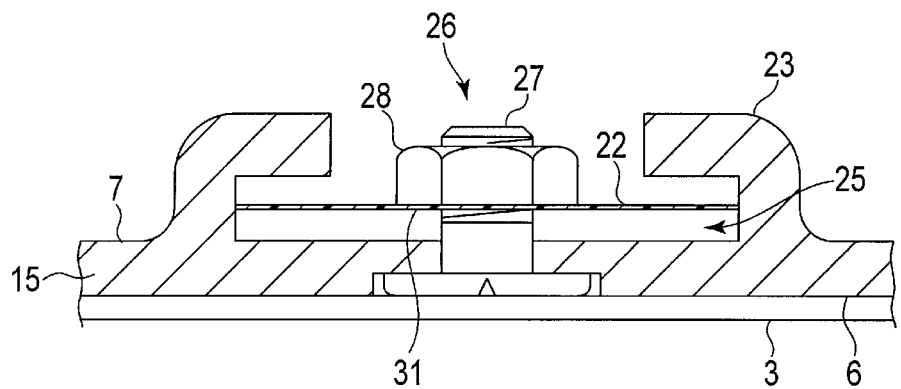
F I G. 18

ELECTRONIC APPARATUS

CROSS-REFERENCE TO RELATED APPLICATIONS

This application claims the benefit of U.S. Provisional Application No. 62/023,522, filed Jul. 11, 2014, the entire contents of which are incorporated herein by reference.

FIELD

Embodiments described herein relate generally to an electronic apparatus.

BACKGROUND

As an electronic apparatus, a tablet terminal (a tablet-type portable computer) provided with a sheet-like flexible display (sheet display) whose display screen is flexibly deformable, for example, is known.

Such a tablet terminal is required to have both sufficient rigidity to keep the sheet display in a flat state, and optimal flexibility to bend the sheet display.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary exploded perspective view of the tablet terminal;

FIG. 17 is an exemplary cross-sectional view showing a shape of the plate spring when the main body is brought into a flat state;

FIG. 18 is an exemplary cross-sectional view showing a shape of the plate spring when the main body is brought into a bent state;

DETAILED DESCRIPTION

Figure 1:
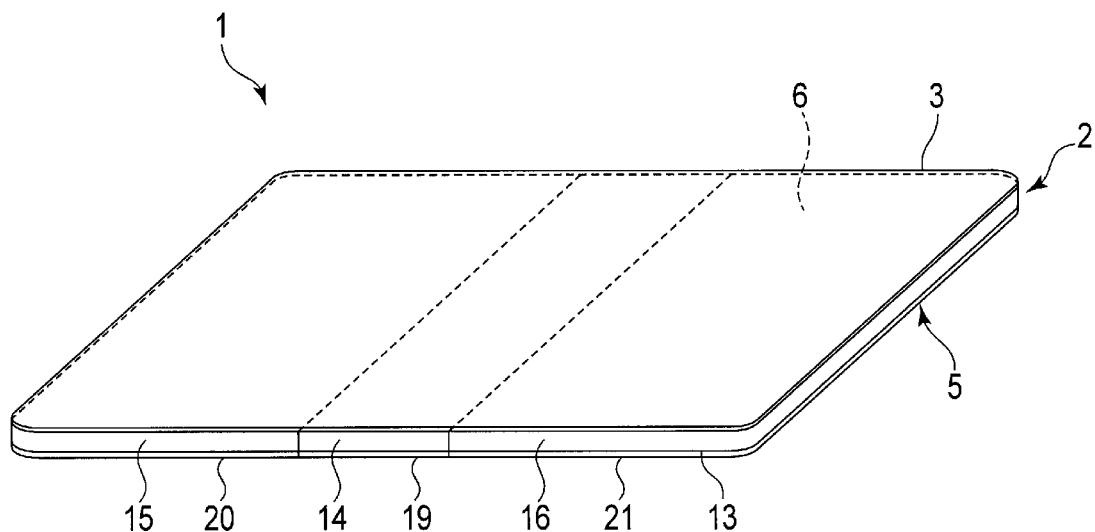
FIG. 1 is an illustration showing an electronic apparatus according to an embodiment, more specifically, an exemplary perspective view of a tablet terminal which is opened such that a sheet display is in a flat state.
Figure 2:
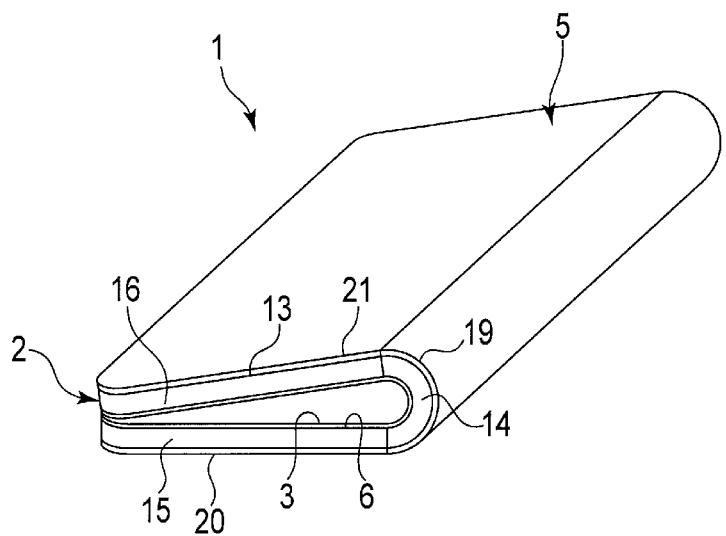
FIG. 2 is an exemplary perspective view of the tablet terminal which is folded such that the sheet display is in a bent state.
Figure 4:
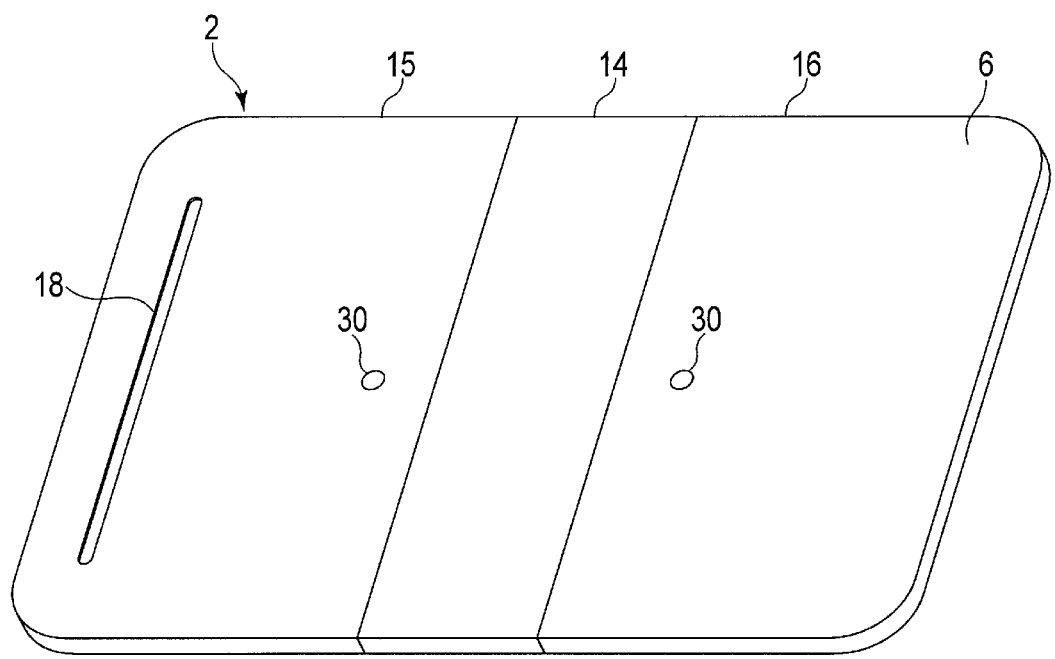
FIG. 4 is an exemplary perspective view of a main body which supports the sheet display as seen from a front surface of the main body.
Figure 5:
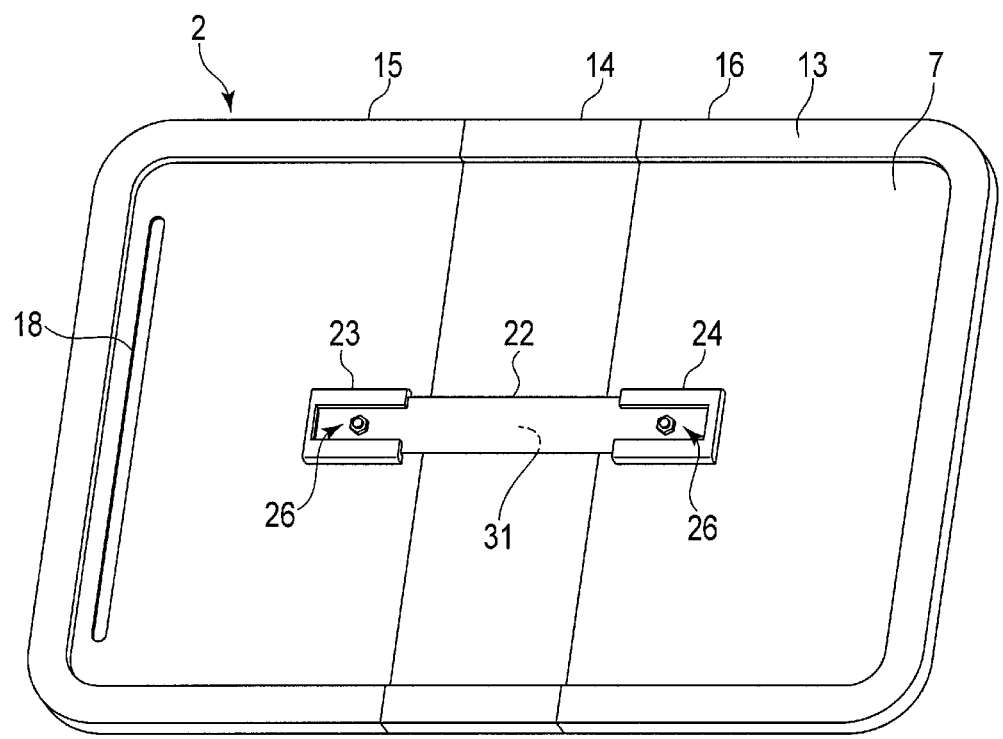
FIG. 5 is an exemplary perspective view of the main body provided with a spring structure as seen from a back surface of the main body.

Various embodiments will be described hereinafter with reference to the accompanying drawings. In general, according to one embodiment, an electronic apparatus comprises a main body deformable in a flat state and a bent state, and a spring structure provided on the main body and configured to keep the main body in the flat state or the bent state. The main body comprises an elastic member, and first and second rigid members. The spring structure comprises a plate spring which extends in a direction of crossing the elastic member, and is supported by the first and the second rigid members on both sides of the plate spring.

The embodiment will now be described with reference to the accompanying drawings.

As an example of the electronic apparatus, FIGS. 1 to 5 and FIGS. 8 and 9 show a tablet terminal 1 (a tablet-type portable computer). The tablet terminal 1 comprises a main body 2 deformable in a flat state and a bent state, a sheet display 3 (a sheet-like flexible display), electronic components 4 for controlling the sheet display 3 and the tablet terminal 1, and a protective cover 5.

The sheet display 3 is supported by a front surface (first surface) 6 of the main body 2. As the sheet display 3, an organic EL display or a liquid crystal display having flexibility as a whole, for example, can be used. As a touch operation function, an on-cell-type touch operation function for which a touch sensor that is not shown is mounted outside the sheet display 3, or an in-cell-type touch operation function for which the touch sensor is incorporated into the sheet display 3 can be applied. By adopting the in-cell-type technique, the sheet display 3 can be made thinner.

The electronic components 4 are supported on a back surface (second surface) 7 of the main body 2. As the electronic components 4, a main substrate 8, batteries 9, a battery control substrate 10, a sheet display control substrate 11, etc., can be applied. The main substrate 8 controls the electronic components 4 provided in the tablet terminal 1. The batteries 9 are a power source for the electronic components 4, and are controlled by the battery control substrate 10. The sheet display control substrate 11 is connected to the sheet display 3 via a flexible printed-circuit board 12 (FIGS. 8 and 9), and controls the sheet display 3 and the touch sensor.

The electronic components 4 are protected by the protective cover 5 such that they are isolated from the outside. The protective cover 5 is attached to a rear surface (third surface) 13 of the main body 2. Likewise the main body 2, the protective cover 5 can be deformed in the flat state and the bent state.

The main body 2 comprises an elastic member 14 which can be elastically deformed, and a first rigid member 15 and a second rigid member 16 arranged on both sides of the elastic member 14. The elastic member 14 is formed of an elastic material such as rubber and an elastomer. The elastic member 14 is structured such that it is elastically stretchable and extendibly bendable as a whole. The first and the second rigid members 15 and 16 are formed of an inelastic material such as metal and resin. Each of the rigid members 15 and 16 is configured to have certain rigidity as a whole.

As a method of fixing the elastic member 14 and the first and the second rigid members 15 and 16, the existing fixing technique, such as insert molding, compression molding, and adhesive bonding, can be applied. The first and the second rigid members 15 and 16 can be pivoted about the elastic member 14. Accordingly, the main body 2 can be deformed from the flat state (FIG. 1) to the bent state (FIG. 2) at the elastic member 14, and vice versa, from the bent state to the flat state. Consequently, the state of the tablet terminal 1 comprising the main body 2 can be switched between a folded state and an open state.

As the shape of the main body 2, the drawings illustrate the main body 2 having a rectangular shape. However, the shape is not limited to this, and the main body 2 may be shaped into any form, such as circular or elliptical. Further, as regards the size and the shape of the first and the second rigid members 15 and 16, while the drawings illustrate the first and the second rigid members 15 and 16 which are identical in size and shape, they are not limited to the illustration. That is, the first and the second rigid members 15 and 16 may have sizes and shapes different from each other.

In the main body 2, in a range extending over the elastic member 14 and the first and the second rigid members 15 and 16, the front surface (first surface) 6 of the main body 2, and the back and rear surfaces (second surface and third surface) 7 and 13 on the opposite side are formed.

On the front surface (first surface) 6 of the main body 2, the sheet display 3 is supported in a deformable way. The first surface 6 becomes a flat surface as the elastic member 14 and the first and the second rigid members 15 and 16 are positioned on the same plane when the main body 2 is brought into the flat state. Further, the first surface 6 becomes a deformed (bent) surface as the first and the second rigid members 15 and 16 are folded at the elastic member 14 when the main body 2 is brought into the bent state. The way of supporting the sheet display 3 on the front surface (first surface) 6 of the main body 2 will be described later in detail.

On the back surface of the main body 2, the electronic components 4 are supported on the second surface 7, and the protective cover 5 is supported on the third surface 13. The third surface 13 is formed as a cover-supporting surface 13 having a frame-like structure which is continuous along a periphery (edge) on the back surface of the main body 2. The second surface 7 is formed as a component-supporting surface 7 obtained by making the entire surface of an inner area of the cover-supporting surface 13 more depressed than the cover-supporting surface 13 and flat. In other words, the component-supporting surface (second surface) 7 is formed by depressing the inner area to be flat over the whole of the elastic member 14 and the first and the second rigid members 15 and 16. The cover-supporting surface (third surface) 13 is formed on a portion remaining around the component-supporting surface (second surface) 7.

In the component-supporting surface (second surface) 7, the electronic components 4 are supported in such a way that the components are distributed into the first rigid member 15 and the second rigid member 16. The drawing shows as an example (FIG. 8) that the main substrate 8 and the sheet display control substrate 11 are supported on the first rigid member 15, and the batteries 9 and the battery control substrate 10 are supported on the second rigid member 16. As the way of supporting the electronic components 4, the existing supporting method such as screwing and adhesive bonding can be applied. Note that the main substrate 8 and the battery 9 are connected to each other by a connection cable 17 such as a flexible harness and a flexible substrate.

Figure 8:
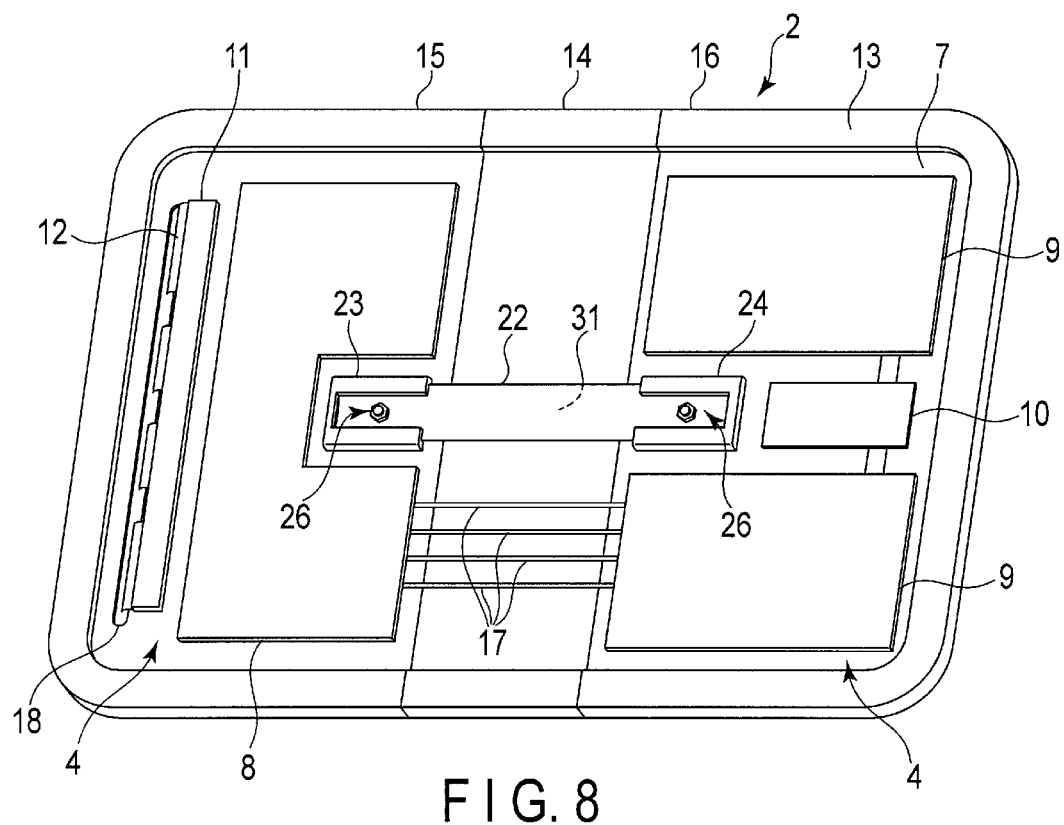
FIG. 8 is an exemplary perspective view of the main body on which electronic components are supported as seen from the back surface of the main body.
Figure 9:
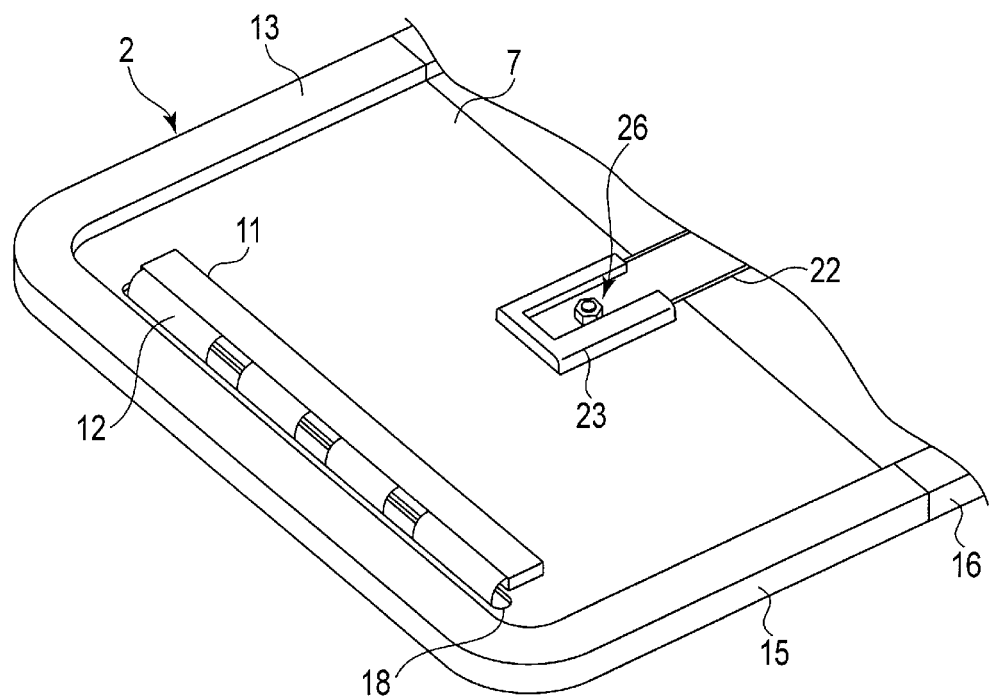
FIG. 9 is an exemplary perspective view for explaining a way of arranging a drive substrate for driving the sheet display on the main body.

Further, the flexible printed-circuit board 12 which connects the sheet display control substrate 11 and the sheet display 3 is passed into an oblong path 18 penetrating the first rigid member 15 (see FIGS. 8 and 9). The sheet display control substrate 11 can be arranged on the back surface of the main body 2 that is offset from the front surface (first surface) 6 of the main body 2, that is, the component-supporting surface (second surface) 7. In this way, the entire front surface (first surface) 6 of the main body 2 can be formed as a continuous surface without projections and depressions. Consequently, the sheet display 3 can be supported stably.

Also, by arranging the protective cover 5 on the cover-supporting surface (third surface) 13 after the electronic components 4 are supported on the component-supporting surface (the second surface 7), the electronic components 4 can be protected in such a way that they are isolated from the outside. The protective cover 5 comprises an elastic protective member 19 which can be elastically deformed, and a first rigid protective member 20 and a second rigid protective member 21 arranged on both sides of the elastic protective member 19. The protective cover 5 is configured such that it is deformable in a flat state and a bent state following the main body 2.

The elastic protective member 19 is formed of an elastic material such as rubber and an elastomer. The elastic protective member 19 is configured to have flexibility as a whole. The first and the second rigid protective members 20 and 21 are formed of an inelastic material such as metal and resin. Each of the rigid protective members 20 and 21 is configured to have certain rigidity as a whole.

As a method of fixing the elastic protective member 19 and the first and the second rigid protective members 20 and 21, the existing fixing technique, such as insert molding, compression molding, and adhesive bonding, can be applied. The first and the second rigid protective members 20 and 21 can be pivoted about the elastic protective member 19. Accordingly, the protective cover 5 can be deformed from the flat state (FIG. 1) to the bent state (FIG. 2) at the elastic protective member 19, and vice versa, from the bent state to the flat state, following the main body 2. Note that the shape of the protective cover 5 is set in accordance with the shape of the main body 2.

According to such tablet terminal 1, for example, when the table terminal 1 is opened (FIG. 1) to bring the main body 2 into the flat state, a touch operation of the sheet display 3 is enabled. In contrast, when the tablet terminal 1 is folded (FIG. 2) to bring the main body 2 into the bent state, the sheet display 3 can be accommodated within the main body 2 and protected. In this state, since the exterior of the main body 2 is covered by the protective cover 5, the whole tablet terminal 1 can be protected.

Figure 10:
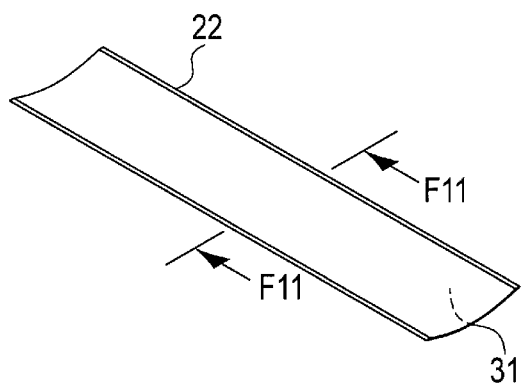
FIG. 10 is an exemplary perspective view of a plate spring which is linearly extended.
Figure 11:
FIG. 11 is an exemplary cross-sectional view taken along line F11-F11 of FIG. 10.
Figure 12:
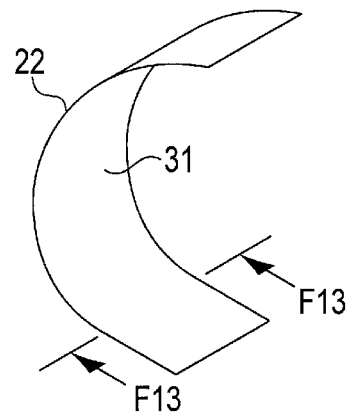
FIG. 12 is an exemplary perspective view of the plate spring which is bent and extended.

Further, as shown in FIGS. 5 to 8, and 10 to 13, the tablet terminal 1 described above comprises the spring structure which keeps the tablet terminal 1 in the open state or the folded state. The spring structure is provided on the component-supporting surface (second surface) 7 on the back surface of the main body 2. The spring structure comprises a plate spring 22 which keeps the main body 2 in the flat state or the bent state. The plate spring 22 is configured such that it is elastically deformable in a linearly extended state (FIG. 10) and a bent and extended state (FIG. 12). The plate spring 22 is arranged to extend in a direction of crossing the elastic member 14 of the main body 2.

More specifically, when the main body 2 is deformed in the flat state and the bent state to switch the state of the tablet terminal 1 to the open state and the folded state, the elastic member 14 is elastically deformed at a straight folding line (not shown). The plate spring 22 is arranged to extend in a direction of crossing the folding line, that is, along a direction orthogonal thereto.

The plate spring 22 is supported by the first and the second rigid members 15 and 16 at both sides (ends) of the plate spring 22. As a method of supporting the plate spring 22, the first rigid member 15 and the second rigid member 16 are provided with a first holder 23 and a second holder 24, respectively, such that the both sides (ends) of the plate spring 22 are embraced from their outer sides.

The first holder 23 is arranged on the first rigid member 15, and the second holder 24 is arranged on the second rigid member 16. The first and the second holders 23 and 24 are positioned to face each other such that the both sides (ends) of the plate spring 22 can be inserted therein. The first and the second holders 23 and 24 are configured to project from the component-supporting surface (second surface) 7.

The amount of a rise (height) of each of the holders 23 and 24 should preferably be set within the range of a difference in height between the component-supporting surface (second surface) 7 and the cover-supporting surface (third surface) 13. Accordingly, it is possible to arrange the protective cover 5 on the cover-supporting surface (third surface) 13 without causing interference between each of the holders 23 and 24 and the protective cover 5.

Figure 13:
FIG. 13 is an exemplary cross-sectional view taken along line F13-F13 of FIG. 12.

The first and the second holders 23 and 24 are provided with reception portions 25, respectively, in which the both sides (ends) of the plate spring 22 can be inserted and positioned. In the linearly extended state (FIG. 10), the plate spring 22 has an arch structure (FIG. 11) which is convexly curved in a direction orthogonal to the extending direction. Further, in the bent and extended state (FIG. 12), the plate spring 22 becomes flat along a direction orthogonal to the extending direction (FIG. 13).

Accordingly, the reception portions 25 of the first and the second holders 23 and 24 are configured such that the above-mentioned change in the state is allowed, and also the plate spring 22 can be supported. That is, each of the reception portions 25 has gap G (FIG. 7) allowing elastic deformation (i.e., a difference in height) in both cases where the plate spring 22 is elastically deformed from a curved shape to a flat shape (FIG. 18), and where the same is elastically deformed from the flat shape to the curved shape (FIG. 17).

Further, in order to prevent the both sides (ends) of the plate spring 22 from falling out of the holders 23 and 24 when the plate spring 22 is elastically deformed, both sides (ends) of the plate spring 22 are positioned on the first and the second rigid members 15 and 16 by means of fall-out prevention mechanisms 26. The drawings show as an example the fall-out prevention mechanism 26 comprising a bolt 27 and a nut 28.

In the fall-out prevention mechanisms 26, when the both sides (ends) of the plate spring 22 are inserted and positioned in the holders 23 and 24, two through-holes 29 formed on the plate spring 22, and two through-holes 30 formed on the first and the second rigid members 15 and 16 (the main body 2) face each other. In such a state, the bolt 27 is inserted into each of the facing holes 29 and 30 from the side of the front surface (first surface) 6 of the main body 2. Further, the nuts 28 are fastened with the bolts 27, respectively, from the side of the back surface (second surface) 7 of the main body 2.

In this way, when the main body 2 is deformed in the flat state and the bent state at the elastic member 14, the both sides (ends) of the plate spring 22 are always positioned at the holders 23 and 24, respectively, and they will not fall out of their respective holders 23 and 24. Consequently, the state of the tablet terminal 1 can be stably switched between the folded state and the open state.

Figure 7:
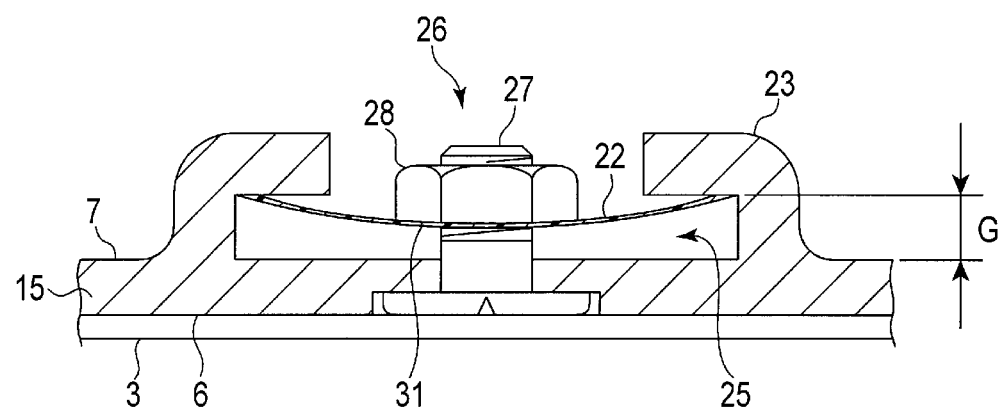
FIG. 7 is an exemplary cross-sectional view taken along line F7-F7 of FIG. 6.

Although FIGS. 7, 17, and 18 show only the internal structure of the first holder 23, the internal structure of the second holder 24 is similar. Thus, illustration of the second holder 24 is omitted.

Further, when the main body 2 is brought into the flat state, the plate spring 22 is supported by the first and the second holders 23 and 24 such that a convex surface 31 on a convexly curved side faces the elastic member 14. In this case, when the main body 2 is deformed into the bent state, the plate spring 22 is folded back such that the convex surface 31 is at an inner side (FIG. 12). Meanwhile, when the main body 2 is deformed into the flat state, the plate spring 22 is developed such that the convex surface 31 is at an outer side (FIG. 10).

According to such a supporting structure, when the state of the tablet terminal 1 is switched from the open state to the folded state, for example, the main body 2 is deformed from the flat state to the bent state at the elastic member 14. When the main body 2 is brought into the bent state, the plate spring 22 is bent and extended (FIG. 12). At the same time, the plate spring 22 becomes flat along a direction which is orthogonal to the extending direction (FIG. 13). Here, the plate spring 22 is annularly maintained by its own elasticity. As a result, the main body 2 is kept in the bent state.

Further, according to such a supporting structure, when the state of the tablet terminal 1 is switched from the folded state to the open state, for example, the main body 2 is deformed from the bent state to the flat state at the elastic member 14. When the main body 2 is brought into the flat state, the plate spring 22 extends linearly (FIG. 10). At the same time, the plate spring 22 is convexly curved in a direction which is orthogonal to the extending direction (FIG. 11). Here, the plate spring 22 has the arch structure which is convexly curved, and its linearly extending form is maintained due to the constant curvature of the plate spring 22. Consequently, the main body 2 is kept in the flat state.

In the meanwhile, the elastic member 14 of the main body 2 is structured such that it is elastically stretchable and extendibly bendable as a whole. Accordingly, when the main body 2 is deformed in the bent state and the flat state at the elastic member 14, the elastic member 14 will not have creases over the front surface and the back surface of the elastic member 14.

Figure 15:
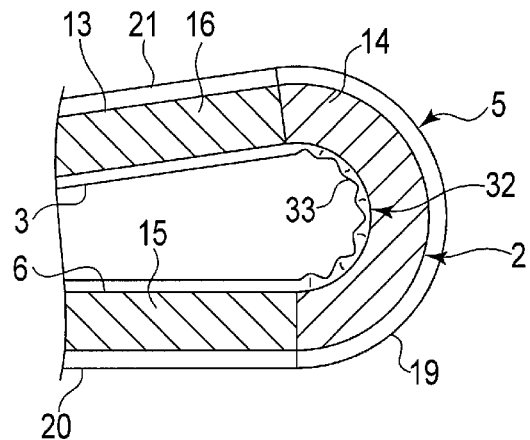
FIG. 15 is an exemplary partial cross-sectional view showing a bent state of the sheet display having creases when the tablet terminal is folded.

In contrast, although the sheet display 3 has flexibility, elasticity of the sheet display 3 is inferior to the elastic member 14. Accordingly, when the sheet display 3 is deformed together with the main body 2, creases 33 are formed in a bent portion 32 of the sheet display 3 (FIG. 15).

In order to prevent the creases 33 from being formed, it is sufficient if the sheet display 3 can be deformed with a curvature which will not form the creases 33 in the bent portion 32. That is, the sheet display 3 is deformed in such a way that the curvature of the bent portion 32 is small, i.e., the radius of curvature of the bent portion 32 becomes large.

In order to reduce the curvature (i.e., increase the radius of curvature) of the bent portion 32, in deforming the sheet display 3, a space (not shown) needs to be secured outside the bent portion 32, that is, between the bent portion 32 and the elastic member 14.

In order to secure the space, when the state of the tablet terminal 1 is switched from the open state to the folded state, that is, when the main body 2 is deformed from the flat state to the bent state, it is sufficient if the elastic member 14 can be elastically deformed in a direction of separating the elastic member 14 from the sheet display 3. In this case, if the elastic member 14 can be drawn to the outer side, the elastic member 14 can be elastically deformed in the direction of separating the elastic member 14 from the sheet display 3.

Hence, as a structure of drawing the elastic member 14 to the outer side, the plate spring 22 and the elastic member 14 are connected to each other. More specifically, the convex surface 31 of the plate spring 22 is connected to the elastic member 14. As a method of connection, a method of connecting the two by an adhesive or a rivet, or a method of connecting the two by a laser can be applied.

In the connection method using the laser, the plate spring 22 and the elastic member 14 are disposed to overlap each other. The laser is irradiated along the overlapping portion. The elastic member 14 is melted. Here, the elastic member 14 which has been melted is bonded to the plate spring 22. In this way, the plate spring 22 (the convex surface 31) and the elastic member 14 can be connected.

Figure 6:
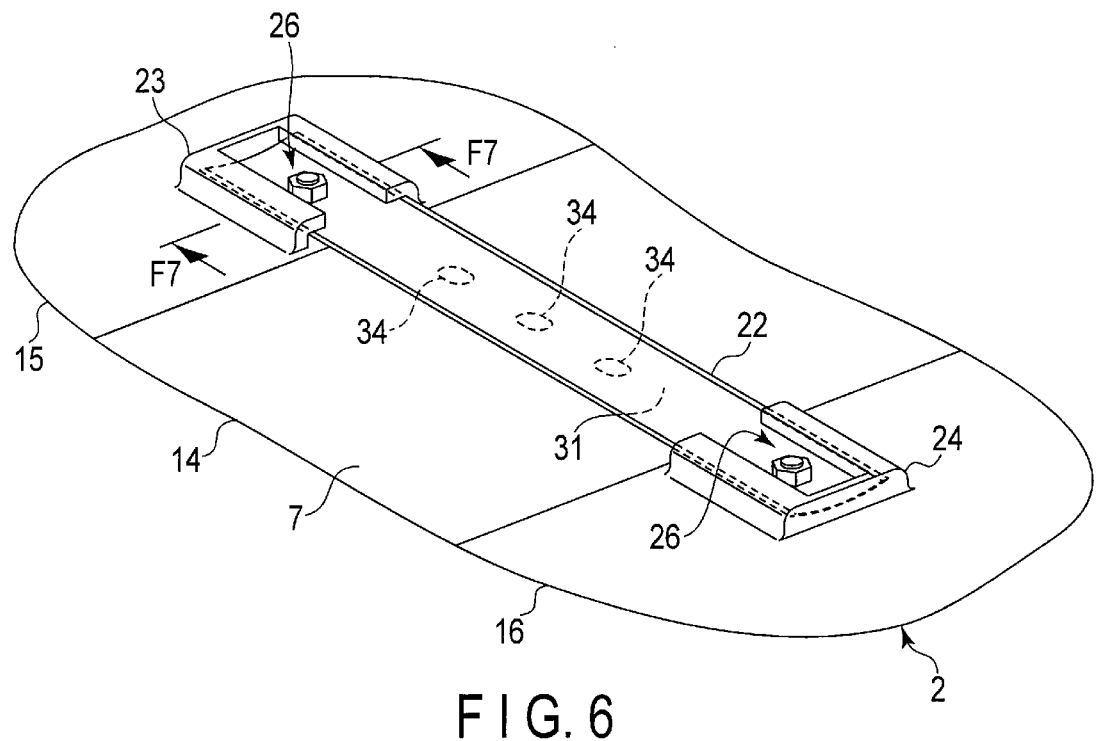
FIG. 6 is an exemplary perspective view of the spring structure in an enlarged scale.

Further, in the connection method using the laser, the laser may be irradiated entirely along the portion where the plate spring 22 and the elastic member 14 are overlapped, or irradiated partially. FIG. 6 shows as an example a structure in which the elastic member 14 is partially melted by the laser, and the plate spring 22 (the convex surface 31) and the elastic member 14 are connected by melted portions 34.

In this structure, when the main body 2 is deformed from the flat state to the bent state, the plate spring 22 is elastically deformed from the curved shape (FIG. 17) to the flat shape (FIG. 18). Here, the convex surface 31 of the plate spring 22 is distanced from the elastic member 14 by an amount of change from the curved shape to the flat shape. Since the convex surface 31 is connected to the elastic member 14, a tensile force works on the elastic member 14 from the plate spring 22 by an amount the convex surface 31 is distanced from the elastic member 14.

Figure 16:
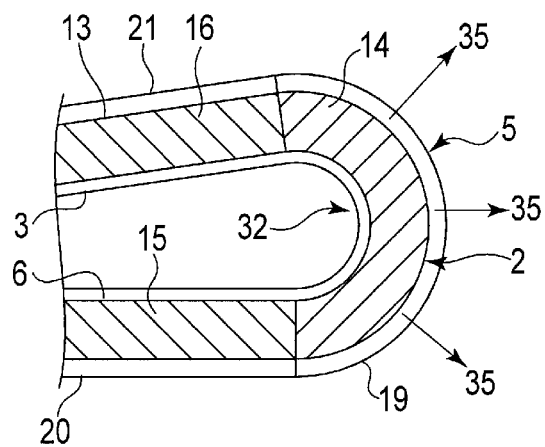
FIG. 16 is an exemplary partial cross-sectional view showing a bent state of the sheet display on which creases are prevented from being formed.

The elastic member 14 is structured such that it is elastically stretchable and extendibly bendable as a whole. Accordingly, the elastic member 14 is elastically deformed by the tensile force from the plate spring 22. That is, the elastic member 14 is drawn in an outer direction 35 (FIG. 16). The elastic member 14 is thereby elastically deformed in the direction of separating from the sheet display 3.

At this time, a space (not shown) is formed between the elastic member 14 and the sheet display 3 by an amount the elastic member 14 is elastically deformed. The space is located outside the bent portion 32 when the sheet display 3 is deformed.

As the space is formed outside the bent portion 32, the curvature of the bent portion 32 can be reduced when the sheet display 3 is deformed. In other words, the radius of curvature of the bent portion 32 can be increased. As a result, the sheet display 3 can be deformed without having the creases 33 (FIG. 15) in the bent portion 32 (see FIG. 16).

From the standpoint of preventing occurrence of the creases 33 (FIG. 15), in supporting the sheet display 3 on the front surface (first surface) 6 of the main body 2, a portion facing the elastic member 14 of the sheet display 3 should preferably be formed as a non-bonded portion which is not bonded to the first surface 6, and other portions should preferably be bonded to the first surface 6.

Figure 14:
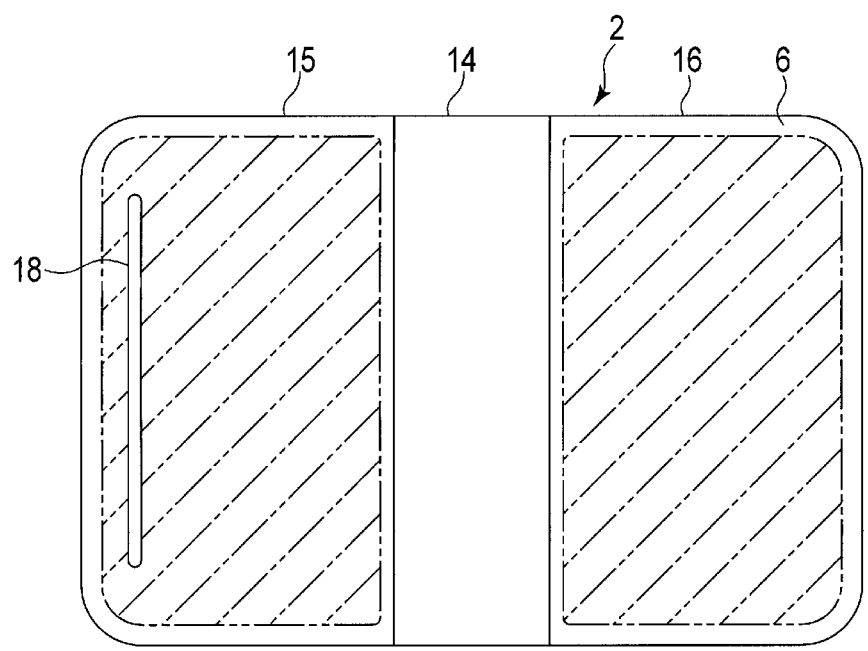
FIG. 14 is an exemplary plan view showing bonding positions of the sheet display on the front surface of the main body.

That is, the sheet display 3 is bonded to the portions excluding the elastic member 14 of the first surface 6 (see FIG. 14). In other words, the sheet display 3 is bonded to only the first and the second rigid members 15 and 16. As a method of bonding, the sheet display 3 may be adhered to the first and the second rigid members 15 and 16 by an adhesive, for example.

In this case, the portion facing the elastic member 14 (non-bonding portion) serves as the bent portion 32 of the sheet display 3. Accordingly, by preventing the bent portion 32 and the elastic member 14 from being bonded (adhered) to each other, when the main body 2 is deformed, the bent portion 32 can be deformed freely. In this way, occurrence of the creases 33 (FIG. 15) in the bent portion 32 can be more reliably prevented (see FIG. 16).

As described above, according to the present embodiment, by using the plate spring 22 which has the arch structure in the linearly extended state, the electronic apparatus (the tablet terminal 1) having both the rigidity sufficient to keep the sheet display 3 in the flat state, and the flexibility optimal to bend the sheet display 3 can be realized.

According to the present embodiment, together with the spring structure comprising the above-described plate spring 22, the electronic components 4 for controlling the sheet display 3 can be supported on the back surface (second surface) 7 of the main body 2 of the tablet terminal 1 collectively. In this way, the entire front surface (first surface) 6 of the main body 2 can be formed as a continuous surface without projections and depressions. Consequently, the sheet display 3 can be supported stably.

According to the present embodiment, the main constituent elements of the spring structure are only the plate spring 22 and the two holders 23 and 24 which support the plate spring 22. Accordingly, the number of components of the tablet terminal 1 can be significantly reduced as compared to conventional products. As a result, lightness and reduction in cost of the tablet terminal 1 can be realized.

According to the present embodiment, the spring structure and the electronic components 4 can be arranged collectively on the component-supporting surface (second surface) 7 constituted by depressing the back surface of the main body 2. By virtue of the above feature, the tablet terminal 1 can be made considerably slim as compared to the conventional products.

According to the present embodiment, the curvature of the bent portion 32 of the sheet display 3 can be reduced by elastically deforming the elastic member 14 outwardly by the tensile force from the plate spring 22 which is changed from the curved shape to the flat shape when the tablet terminal 1 is folded. By virtue of the above feature, the sheet display 3 can be deformed without causing the creases. As a result, it is possible to prevent the sheet display 3 from being degraded in a short time.

According to the present embodiment, in a state where the tablet terminal 1 is folded, the sheet display 3 is accommodated within the main body 2, and protected by the protective cover 5 outside the main body 2. Accordingly, when the tablet terminal 1 is to be carried in a bag, for example, the sheet display 3 will not be damaged and can be prevented from becoming dirty, etc.

According to the present embodiment, by merely folding the tablet terminal 1, the entire tablet terminal 1 can be protected by the protective cover 5 outside the main body 2. For this reason, there is no need to separately purchase a protective cover as has been required in the past. As a result, it is possible to cut out unnecessary expenses.

The embodiment described above is merely an example, and modifications which will be described below are also included in the technical scope of the invention defined by the accompanying claims.

In the above embodiment, the spring structure comprising a single plate spring 22 is assumed. However, the spring structure may comprise a plurality of plate springs 22. The plurality of plate springs 22 can be arranged at predetermined intervals (for example, at even intervals) along the elastic member 14. By increasing the number of plate springs 22, the main body 2 can be kept in the flat state or the bent state more accurately. Consequently, the state of the tablet terminal 1 can be more stably switched between the open state and the folded state.

In the above embodiment, while the bent portion 32 (non-bonded portion) of the sheet display 3 is not bonded to the elastic member 14, the bent portion 32 and the elastic member 14 may be temporarily joined. As a structure for achieving a temporary joint, in addition to providing a magnetic body on the bent portion 32, for example, a permanent magnet is provided on the component-supporting surface (second surface) 7 at the back of the main body 2 facing the bent portion 32. Alternatively, in addition to providing a permanent magnet on the bent portion 32, a magnetic body is provided on the component-supporting surface (second surface) 7 at the back of the main body 2 facing the bent portion 32. Note that the permanent magnet may be provided on both.

In such a structure, the bent portion 32 can be adsorbed to the elastic member 14 by magnetic force. In this way, when the tablet terminal 1 is open, it is possible to prevent a gap from being formed between the bent portion 32 of the sheet display 3 and the elastic member 14.

It should be noted that the magnetic body or the permanent magnet to be provided on the bent portion 32 should preferably have flexibility equivalent to that of the sheet display 3. For example, a flexible sheet (not shown) containing a metal material having a magnetic property is applied. The flexible sheet may be adhered to a back surface of the sheet display 3 corresponding to the bent portion 32 (non-bonded portion).

Meanwhile, the magnetic body or the permanent magnet to be provided on the component-supporting surface (second surface) 7 may be newly added separately, or the magnetized plate spring 22 may be applied.

Figure 19:
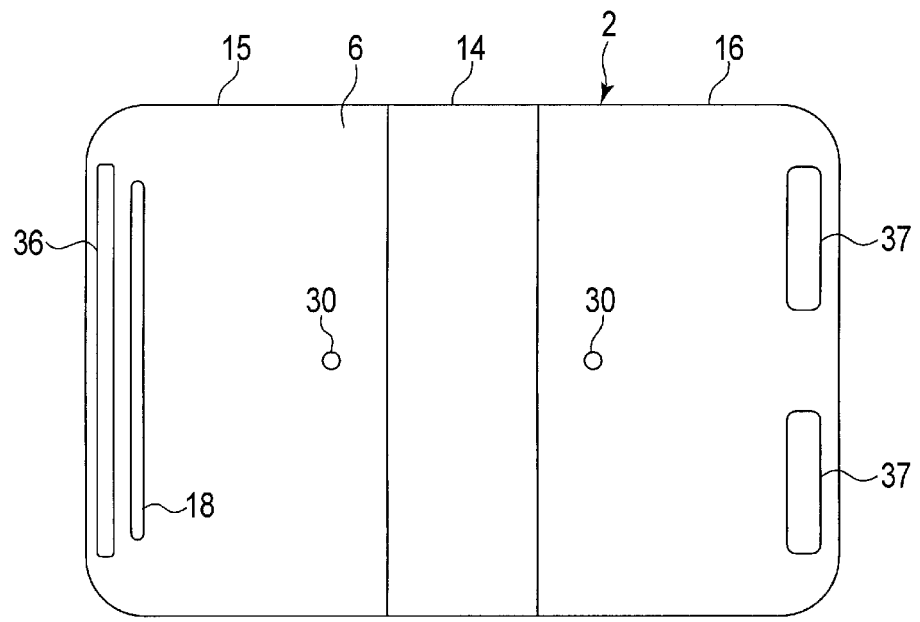
FIG. 19 is an exemplary plan view of the main body provided with a retention mechanism for retaining the folded tablet terminal not to be opened.
Figure 20:
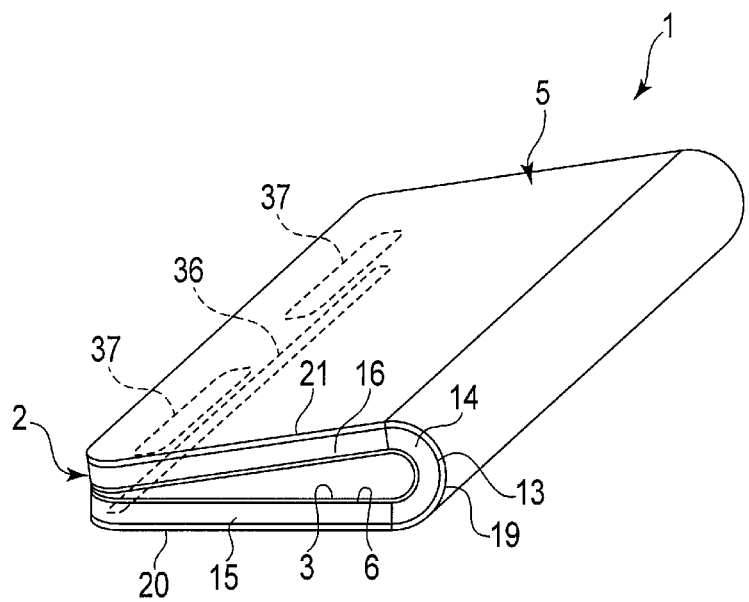
FIG. 20 is an exemplary perspective view of the tablet terminal held in a folded state by the retention mechanism.

In the above embodiment, a retention mechanism for retaining the bent state when the main body 2 is brought into the bent state may be provided. As the retention mechanism, a band, a fastener, or the like, for example, can be assumed. As an example, FIGS. 19 and 20 show the retention mechanism for retaining the bent state by the magnetic force.

The retention mechanism comprises a magnetic body 36 provided on the first rigid member 15, and a permanent magnet 37 provided on the second rigid member 16. The magnetic body 36 and the permanent magnet 37 are arranged at portions where the two face each other in proximity of the first and the second rigid members 15 and 16 when the main body 2 is brought into the bent state.

According to such a retention mechanism, when the main body 2 is brought into the bent state, the magnetic body 36 and the permanent magnet 37 are attracted to each other by magnetic force. Thus, the bent state is retained. Consequently, it is possible to keep the tablet terminal 1 in the folded state more reliably.

Figure 21:
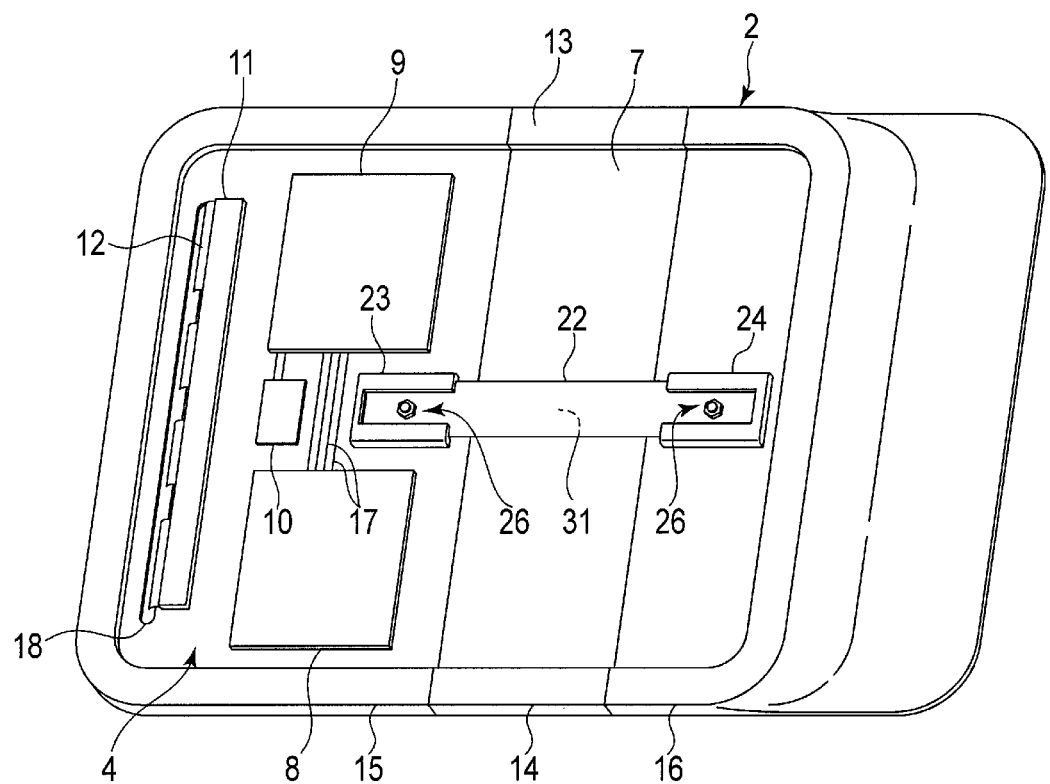
FIG. 21 is an exemplary perspective view of the main body on which electronic components are supported on one side as seen from the back surface of the main body.

In the above embodiment, the electronic components 4 are arranged such that the components are distributed into the first rigid member 15 and the second rigid member 16. However, they may be arranged on either of the rigid members collectively. As an example, FIG. 21 shows a structure in which the electronic components 4 are supported on only the first rigid member 15. That is, the electronic components 4 are arranged to be concentrated on the first rigid member 15.

Figure 22:
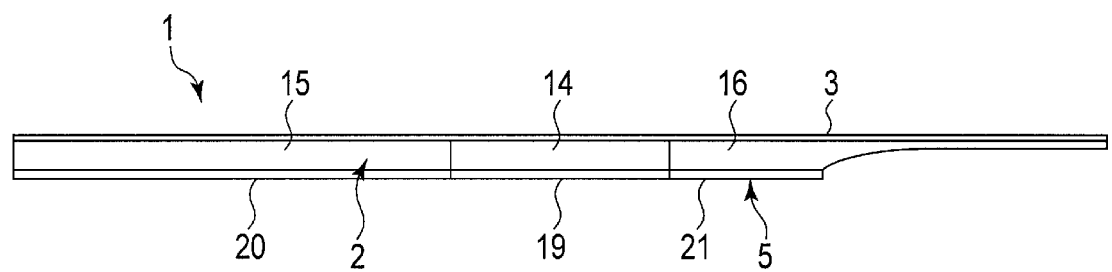
FIG. 22 is an exemplary side view of the tablet terminal comprising the main body shown in FIG. 21.

Accordingly, as shown in FIG. 22, a thickness of the second rigid member 16 can be made smaller than a thickness of the first rigid member 15. As a result, by reduction of the thickness of the second rigid member 16, it is possible to realize slimness and downsizing of the tablet terminal 1 as a whole when it is in the folded state, for example. Further, by the amount the second rigid member 16 is thinned, the tablet terminal 1 as a whole can be made lighter.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a main body deformable in a flat state and a bent state; and
a spring structure on the main body configured to keep the main body in the flat state or the bent state,
wherein
the main body comprises:
an deformable elastic member; and
first and second rigid members on both sides of the elastic member,
the spring structure comprises a plate spring extending in a direction crossing the elastic member, and supported by the first and the second rigid members on both sides of the plate spring,
the plate spring configured to linearly extend and convexly curve in a direction orthogonal to the extending direction when the main body is brought into the flat state, and
the plate spring configured to bend and extend, and become flat in a direction orthogonal to the extending direction when the main body is brought into the bent state, and
further comprising holders on the first and the second rigid members, the holders configured to support the both sides of the plate spring, and the plate spring supported by the holders such that a surface on a convexly curved side faces the elastic member when the main body is in the flat state.

2. The apparatus of claim 1, the holders configured to allow for elastically deforming the plate spring from a curved state to a flattened state.

3. The apparatus of claim 1, the plate spring and the elastic member connected to each other.

4. The apparatus of claim 3, wherein while the main body is deformed from the flat state to the bent state at the elastic member, the elastic member is deformed by the plate spring.

5. The apparatus of claim 1, wherein the main body comprises:
- a first surface configured to support a sheet display in a deformable way; and
- a second surface located on a back side of the first surface, and configured to support electronic components for controlling the sheet display,
- the first surface extending over the elastic member and the first and the second rigid members,
- the first surface configured to become a flat surface as the elastic member and the first and the second rigid members are on a same plane when the main body is brought into the flat state.

6. The apparatus of claim 5, wherein the sheet display is bonded to only the first and the second rigid members of the first surface.

7. The apparatus of claim 6, wherein one of a non-bonded portion which is not bonded to the first surface of the sheet display and a facing portion facing the non-bonded portion of the second surface comprises a magnetic body, and the other portion of the non-bonded portion and the facing portion comprises a permanent magnet.

8. The apparatus of claim 5, wherein the second surface extends over the elastic member and the first and the second rigid members, and
- the electronic components are supported by both the first and the second rigid members.

9. The apparatus of claim 5, wherein the second surface extends over the elastic member and the first and the second rigid members, and
- the electronic components are supported by only the first rigid member.

10. The apparatus of claim 9, wherein a thickness of the second rigid member is less than a thickness of the first rigid member.

11. The apparatus of claim 1, further comprising a retention mechanism for retaining the bent state when the main body is brought into the bent state.

12. The apparatus of claim 11, wherein the retention mechanism comprises:
- a magnetic body on the first rigid member; and
- a permanent magnet on the second rigid member,
- the magnetic body and the permanent magnet arranged at portions where the magnetic body and the permanent magnet face each other in proximity of the first and the second rigid members when the main body is brought into the bent state.

13. The apparatus of claim 5, further comprising:
- a protective cover deformable in the flat state and the bent state following the main body; and
- a third surface around the second surface, and configured to support the protective cover.

* * * * *